US010212034B1

(12) United States Patent
Carranza Giotto et al.

(10) Patent No.: US 10,212,034 B1
(45) Date of Patent: Feb. 19, 2019

(54) AUTOMATED NETWORK CHANGE MANAGEMENT

(71) Applicant: Amazon Technologies, Inc., Seattle, WA (US)

(72) Inventors: Pablo Sebastián Carranza Giotto, Dublin (IE); Devin Kowatch, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 264 days.

(21) Appl. No.: 14/864,718

(22) Filed: Sep. 24, 2015

(51) Int. Cl.
*G06F 9/445* (2018.01)
*H04L 12/24* (2006.01)
*H04L 29/08* (2006.01)

(52) U.S. Cl.
CPC ...... *H04L 41/0816* (2013.01); *H04L 41/0863* (2013.01); *H04L 67/2804* (2013.01); *G06F 9/445* (2013.01)

(58) Field of Classification Search
None
See application file for complete search history.

(56) References Cited

U.S. PATENT DOCUMENTS

| 8,880,690 B1 | 11/2014 | Kennedy et al. | |
|---|---|---|---|
| 2006/0037000 A1* | 2/2006 | Speeter | H04L 67/125 717/120 |
| 2013/0275518 A1* | 10/2013 | Tseitlin | G06F 11/36 709/206 |
| 2014/0173064 A1* | 6/2014 | Newton | H04L 67/289 709/221 |
| 2014/0237464 A1* | 8/2014 | Waterman | G06F 8/65 717/172 |
| 2015/0261521 A1* | 9/2015 | Choi | H04L 9/3247 713/176 |

\* cited by examiner

*Primary Examiner* — Viet D Vu
*Assistant Examiner* — James A Edwards
(74) *Attorney, Agent, or Firm* — Klarquist Sparkman, LLP

(57) ABSTRACT

A method for providing network configuration changes in a service provider environment includes, by a server computer of the service provider environment, selecting a plurality of scripts associated with a corresponding plurality of operations that enable configuration changes to one or more network devices within the service provider environment. A network change procedure is generated based on the selected plurality of scripts. Metadata is read for at least one script of the plurality of scripts in the network change procedure. State information is determined for the at least one script using the metadata. Based on the state information, automatic execution of at least one operation is performed to generate an operation result. A determination is made whether to perform a rollback of the automatic execution based on the operation result.

21 Claims, 8 Drawing Sheets

AUTOMATED NETWORK CHANGE MANAGEMENT

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Network updates for computing resources in a network environment (e.g., a cloud computing environment) can be implemented using a group deployment strategy, making changes on the network as a whole. Under this approach, changes can include copying configuration information directly onto network devices (e.g., through a user interface), and manually evaluating the results and whether the updates either worked or failed as a whole. Accordingly, to recover from failure, the updates would have to be rolled back. In less complex networks, this approach may be ideal in view of the reduced sophistication of the network and the demands placed on the network. However, new approaches that account for making changes within a network in view of network technology, network complexity, and network demand may be desirable.

DETAILED DESCRIPTION

Technologies described herein include systems and methods for providing network configuration changes to one or more network devices, validating the network changes and the network prior to change implementation, making changes to the network using automatic validation and execution of operations, and triggering of automatic rollback to a known (or stable) state of the one or more network devices. As described herein, a network change procedure may be generated, using one or more scripts for performing one or more configuration operations. Networks may include vast numbers of similar hardware and software that may need to be maintained or changed in the same or similar manner. Accordingly, a common script associated with a network may be generated to implement the same type of configuration change across one or more network devices. In some instances, a network change may incorporate several common elements that may be shared amongst different network changes. In this regard, a common script or a series of common scripts may be applied (e.g., as part of a network change procedure) to make uniform and consistent changes to the network. Each script may include metadata, which may indicate whether the script is authorized for automatic execution and/or whether the script has been previously revoked. A validator may be used to test/validate each script, check whether the script metadata is valid, whether the correct script version is being used, and/or whether the script is non-revoked. One or more checks associated with the script can be automatically executed (e.g., by using a check library). The check execution result (e.g., Pass or Fail) may be used to automatically initiate rollback (e.g., upon Fail) or proceed with a next operation.

Figure 1:
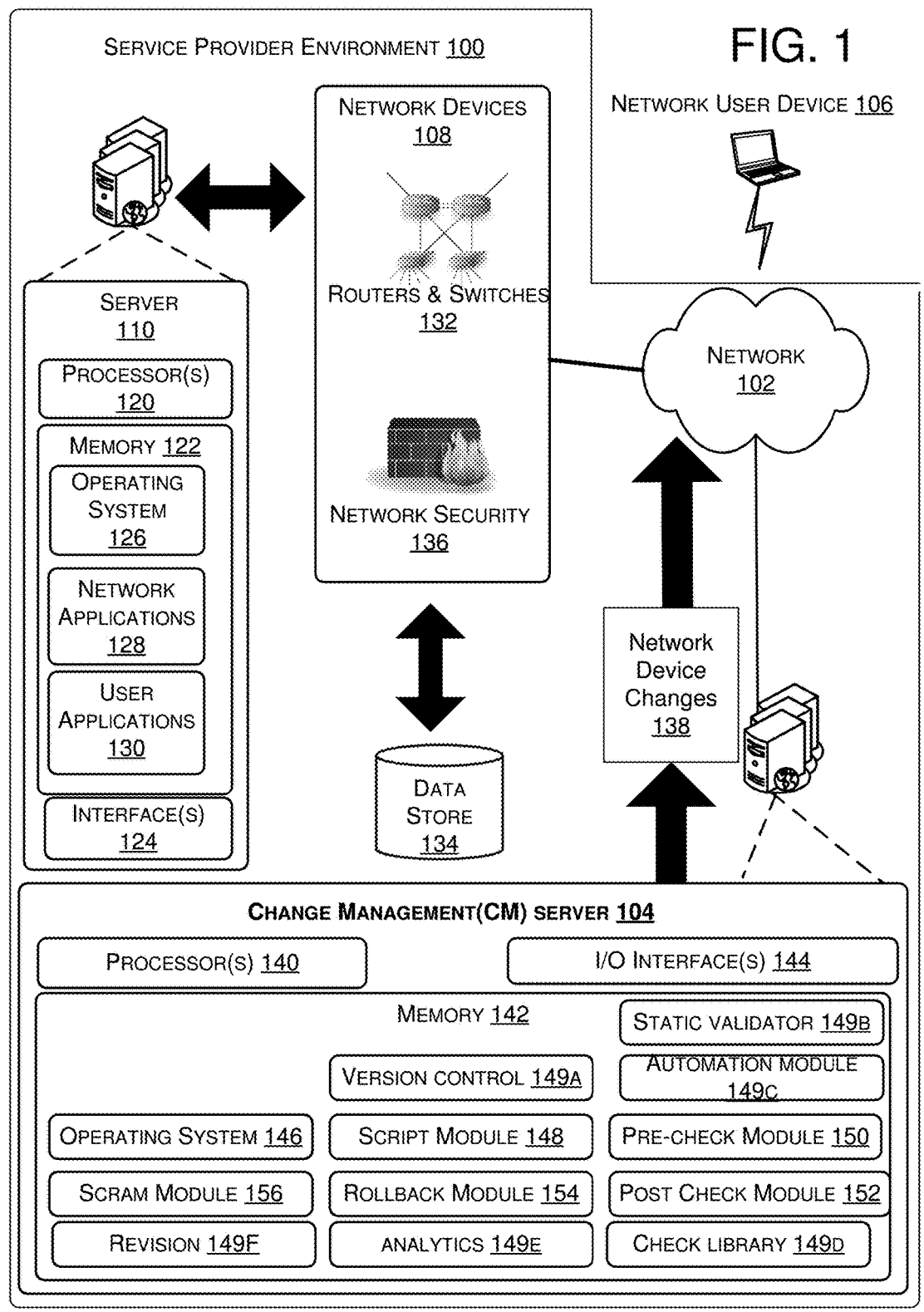
FIG. 1 illustrates a system for automatically implementing configuration changes on a service provider environment, in accordance with an embodiment of the disclosure.

FIG. 1 illustrates a system for automatically implementing configuration changes in a service provider environment, in accordance with an embodiment of the disclosure. Referring to FIG. 1, the service provider environment 100 includes a network 102, change management (CM) server 104, and a user device 106 that may interface with the network 102 via a web server (not illustrated). Further, the network 102 may include network devices 108, which may be devices or components that transfer or processes information between the network user device 106 and the network server 110. At a high level, the CM server 104 may develop and generate a network change procedure that makes changes to the network 102 or direct components of the network 102 to implement specified changes (e.g., one or more configuration changes). The changes may impact any hardware, software, or combination thereof that may be used by the network 102 to process, route, and store information or to provide any service that may be offered over the network 102 to user devices.

The service provider environment 100 may be a multi-tenant cloud network environment where one or more clients (e.g., a user of the network device 106) may run one or more volumes (e.g., storage volumes) on one or more server computers, such as server computer 110 (even though only a single server computer 110 is illustrated in FIG. 1, multiple server computers can be used by the service provider). The server computers (e.g., 110) may be, for example, client servers operated by (or on behalf of) one or more clients of the service provider.

The network 102 may include, but is not limited to: the one or more servers 110, routers and switches 132, data stores 134, or network security elements 136.

The network user device 106 may be equipped with networking equipment and browser software applications that facilitate communications via the Internet or an intranet with one or more of the server computers (e.g., 110, 104) in the service provider environment 100. The network user device 106 may have varied local computing resources, such as central processing units and architectures, memory, mass storage, graphics processing units (GPUs), communication network availability and bandwidth, etc. Although not shown in FIG. 1, the user device 106 may include a processor, memory, and I/O interfaces to view and/or exchange information with the network 102. The processor, memory, and I/O interfaces may be similar to those of network server 110 and the CM server 104. The network user device 106 may include any computing device that interfaces with the network 102. These may include, but are not limited to a desktop personal computer, a lap top computer, a tablet computer, and/or a hand-held computer.

The network 102 may include several network devices 108 and a server 110 that are in electrical communication with each other via the network devices 108. The network server 110 may include: one or more processors 120, memory 122, and Input/Output interfaces 124. The processors 120 may comprise one or more cores and are configured to access and execute (at least in part) instructions stored in the one or more memories 122. The processor 120 may include (without limitation): a central processing unit (CPU), a digital signal processor (DSP), a reduced instruction set computer (RISC), a complex instruction set computer (CISC), a microprocessor, a microcontroller, a field programmable gate array (FPGA), or any combination thereof. The network server 110 may also include a chipset (not shown) for controlling communications between the one or more host processors 120 and one or more of the other components of the network server 110. In certain embodiments, the network server 110 may be based on an Intel® Architecture system and the processor(s) 120 and chipset may be from a family of Intel® processors and chipsets, such as the Intel® Atom® processor family. The one or more host processors 120 may also include one or more application-specific integrated circuits (ASICs) or application-specific standard products (ASSPs) for handling specific data processing functions or tasks.

The one or more memories 122 may include one or more computer-readable storage media ("CRSM"). In some embodiments, the one or more memories 122 may include: non-transitory media such as random access memory ("RAM"), flash RAM, magnetic media, optical media, solid state media, and so forth. The one or more memories 122 may be volatile (in that information is retained while providing power) or non-volatile (in that information is retained without providing power.) Additionally, the memory 122 may store an operating system 126 that includes a plurality of computer-executable instructions that may be implemented by the processor 120 to perform a variety of tasks to operate the interface(s) 124 and any other hardware installed on the network server 110. Generally, the operating system 126 operates as an interface between the hardware and the applications being processed by the network server 110. These may include, but are not limited to: memory management, file system management, device drivers, security, and networking.

The memory 122 may also include, but is not limited to, server/network applications 128 that may be used to perform operations or services on the network 102. For example, this may include interfacing with other network servers or other components on the network 102. The applications 128 may perform functions to sustain network server 110 operations by sending or receiving network traffic to maintain proper communication protocols to ensure a smooth exchange of information between network participants.

The memory may also include, but is not limited to, user applications 130 that may be used to perform operations or services for network users (e.g., network user device 106). This may include sending and receiving instructions or content between the network server 110 and the network user device 106. For example, the network 102 may support online merchant operations in which users query the network 102 looking to purchase goods and/or services from an online merchant. In another embodiment, the network 102 may operate as a remote processing and storage center that a user may use to store data or applications that are processed by the network server 110 and streamed or provided to the network user device 106. For example, the network user device 106 may shift the application processing workload or storage to the network server 110 to minimize the amount of processing and storage workload on the network user device 106.

The Input/Output (I/O) interfaces 124 may comprise one or more communication interfaces (or network interface devices) to provide for the transfer of data between: the other network devices, the CM server 104, network user devices 106 and another device directly (such as in a peer-to-peer fashion) via the network 102, or both. The communication interfaces may include, but are not limited to: personal area networks ("PANs"), wired local area networks ("LANs"), wireless local area networks ("WLANs"), wireless wide area networks ("WWANs"), and so forth. The communication interfaces may utilize acoustic, radio frequency, optical, or other signals to exchange data between the user device 106 and another device such as an access point, a host computer, a server, a router, a reader device, another user device 106, and the like. The network 102 may include, but is not limited to: the Internet, a private network, a virtual private network, a wireless wide area network, a local area network, a metropolitan area network, a telephone network, and so forth.

The network devices 108 may include many different types of hardware, software, and a combination thereof to provide and support various operations, applications, and services. Network devices 108 may include any device or application that facilities communications between the CM server 104, the network user device 106, and the network server 110. The network devices 108 may be considered communication interconnect components that may route, store, or process information between the CM server 104, the network server 110, and the data store 134. By way of example, the network devices 108 may include, but are not limited to, routers and switches 132, network security components 136 (e.g., gateway routers and firewalls), and infrastructure devices and services that support operation of the network.

The routers and switches 132 may couple the components of the network 102 together and facilitate communication between those components. This may include information being sent between the server 110 and data stores 134. The switches may include, but are not limited to, unmanaged switches and managed switches. The managed switches may be configurable either locally or remotely to adapt to network changes as needed. For example, the managed switches may need to be changed to reflect changes in the network to accommodate increased network traffic or network expansion.

Routers may connect one or more networks together and route information received by the network 102. For example, a router may route or dispatch information that is received by the network 102 over the switches to the network server 110. The routers and switches 132 may be programmed to route information in a certain way or they may reference a data store to determine where to send the information. Accordingly, the routers and switches may need to be updated to reflect changes or updates made to the network 102. The routers and switches 132 may also include an access point, a gateway device, a bridge, a hub, and/or a repeater. The access point may be a wired or wireless device that receives information from remote users and transfer the information to the network 102. The gateway device may be used to interface with another network that uses different protocols than the network 102 in FIG. 1. The bridge may be a device that connects several network segments along the data link layer (e.g., Open System Interconnection model layer 2). The hub may multiple segments of the network 102 together to make them act as a single segment. The repeater may be a communications device that may amplify or regenerate communications signals over the network 102.

The network devices 108 may also include one or more network applications and data stores 134 that store information processed by the network server 110. The network applications may include any program or firmware that facilitates the routing, transferring, processing, and/or monitoring of information over the network 102 between the network user device 106 and the network server 110. The data store may include any type of computer readable memory as described above. The data store may store network data or user data as needed to perform the operations, services, or functions as directed by the network administrator.

The network devices 108 may also include network security 136 that protects the network 102 from unauthorized access or monitors network activity to detect malicious behavior on the network 102. The network security 136 may include, but is not limited to, the hardware, software, or combination thereof to implement authentication protocols, firewalls, virus detection, and network monitoring. The network devices 108 described above provide a brief example of the hardware and/or software that may need to be configured, managed, and updated. The CM server 104 can play a role in making updates, changes, or upgrades to the network devices 108.

In one embodiment, the CM server 104 may determine a network device change process for the network devices 108. As shown by block 138, the network change process may be used by the CM server 104 to provide changes to devices in the network 102, e.g., change instructions that are implemented by the network 102 and/or changes to the network devices 108 or 110 directly as needed. In other embodiments, the CM server 104 may also be a component or element of the network 102.

The CM server 104 may include one or more processors 140, memory 142, and I/O interfaces 144 to implement the generation, distribution, and monitoring of network changes (e.g., network device changes 138) for the network devices 108 and/or server 110.

The one or more processors 140 may individually comprise one or more cores (as described above) and are configured to access and execute (at least in part) instructions stored in the one or more memories 142. The one or more memories 142 may comprise one or more CRSMs as described above. More specifically, the one or more memories 142 may store instructions for execution by the one or more processors 140 which perform certain actions or functions. These instructions may include an operating system 146 configured to manage hardware resources (such as the interfaces 144) and provide various services to applications executing on the one or more processors 140. The one or more memories 142 may also store lists, arrays, databases, flat files, and so forth. In some implementations, the memories 142 may be stored in memory external to the CM server 104 but accessible via the network 102, such as with a cloud storage service.

The memory 142 may also include one or more modules to generate and automatically implement the network device changes, and to monitor network 102 performance and take corrective action if the network changes are determined to negatively impact network performance. The modules may include a script module 148 to generate (e.g., compile) scripts and/or determine commands used to roll changes out to devices, a pre-check module 150 that may validate the network device changes 138 and the network 102, a post-check module 152 that may monitor the network 102 during a change implementation, a rollback module 154 that may take corrective action during change implementation, and a scram module 156 that aborts change implementation.

The memory 142 may further include one or more modules, which may be used to automatically implement at least one script of a network change procedure as well as, upon completion of one script (or operation) of a network change procedure, automatically determine whether to proceed with a next script execution or automatically initiate rollback of the network change procedure to a stable state. The additional modules may include a version control module 149a, a static validator module 149b, an automation module 149c, a check library module 149d, an analytics module 149e, and a revision module 149f. The term "module" as used herein may indicate a processor that includes suitable circuitry, interfaces, logic and/or code and is configured to perform one or more dedicated functions as described in connection with the specific module.

The script module 148 may determine commands to apply or generate the network change scripts that direct or make changes to the network devices, such as device 108 or server 110. The network device changes 138 may comprise a plurality of scripts that include instructions to make discrete changes to the network devices 108/110 and scripts may be appended or combined together. The script module 148 may also include or have access to a library of change scripts (e.g., check library 149d) that may be pre-approved by the network administrator to make certain types of changes to the network 102.

The pre-approved scripts may also be arranged into pre-approved sequences, such that the network change procedure 138 may implement changes in a certain order. For example, the scripts may include specific instructions on how to reconfigure or add switches to account for changes or additions to the network devices 108. Another script may specify how to update or change certain types of databases stored in the data store 134. A script may include, but is not limited to instructions for naming convention protocols, file transfer protocols, software patch protocols, software upgrade protocols, security upgrade protocols, and/or any other change that may be implemented on the network devices 108. The execution module 148, in conjunction with the pre-check module 150, may enforce the use of certain scripts that may be used to generate the network change device procedure 138.

The network administrator may also approve sequences and/or orders of scripts to ensure or regulate network change implementation. The consistency between scripts or sequences of scripts enforces consistent changes and increases conformity between different users that are making changes to the network devices 108. For example, a network change to one component may also require additional changes to other components or databases to properly implement the change. A network application 128 change may also require the network server 110 to upgrade or modify its operating system 126. For example, the network application may include firewall or network security applications. Accordingly, the network change process may include a script to upgrade the network application 128 and the operating system 126.

Further, the script module 148 may dictate that the operating system 126 should be upgraded before the making any changes to network application 128. In another embodiment, the network application 128 change may not require an operating system 126 upgrade. In this instance, the script module 148 may not generate the network device changes 138. However, the network application 128 change may require a new database to store new information or update to an existing database to accommodate format or structural changes to the data being stored in the database. In this case, the script module 148 may require that a database script be implemented prior to making the network application change.

In accordance with one or more embodiments, the script module 148 may implement a version control module 149a and/or a static validator module 149b. The version control module 149a may store templates and may be used to change/evolve templates (e.g., via the version control input 430 in FIG. 4). The version control module 149a is illustrated in greater detail in reference to FIG. 4.

The analytics module 149e may comprise suitable circuitry, interfaces, logic and/or code and may be configured to track statistics and information associated with execution of various templates and scripts for one or more network change procedures. For example, the analytics module 149e may track how much time it took for a given script to execute, whether or not execution was successful. Such tracking/analytics information may be stored per script, per template and/or based on the template version number. The information generated by the analytics module 149e may be used by the revision module 149f. The revision module 149f may comprise suitable circuitry, interfaces, logic and/or code and may be configured to perform revisions of templates/scripts, as well as revocation or approval, based on information received from the analytics module 149e. For example, a certain script may be revoked (or modified) if it is taking too much time to execute or if there are failures during execution. The revision modules 149e, 149f can perform these actions before and/or after a network change procedure, which procedure is described in more detail below.

Figure 4:
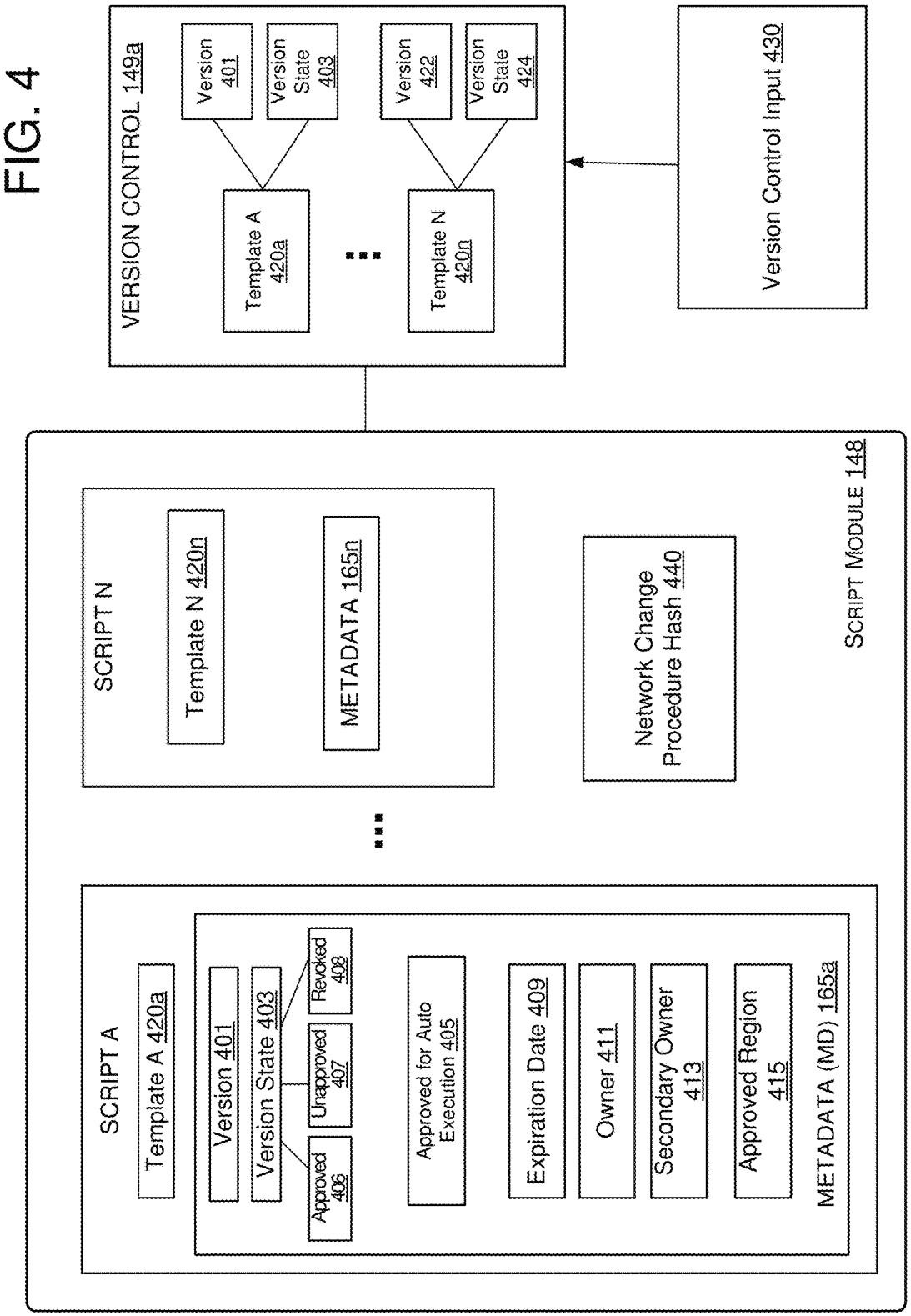
FIG. 4 illustrates a block diagram of a script module using a version control module, in accordance with an embodiment of the disclosure.

FIG. 4 illustrates a block diagram of a script module using a version control module, in accordance with an embodiment of the disclosure. Referring to FIGS. 1 and 4, the script module 148 may be used to generate one or more scripts (e.g., scripts A, . . . , N) for the network change procedure 138. In an example script generation for script A, a script template 420a may be selected (e.g., from a template library). Additional metadata (MD) 165a may also be defined and included as part of the script A. The MD 165a may include a version number 401, script expiration date 409, script owner 411, a secondary owner 413, and approved network region 415 for executing the script (e.g., can be one or more geographic regions or other regions territorially limiting script execution). The static validator 149b may then perform testing of the generated script and validate it for automatic execution. For example, the static validator 149b may access the version control module 149a and locate template 420a based on, for example, the template version number 401. The version control module 149a stores the templates, corresponding versions (401, 422) and version state (403, 424). The version state can include approved state (406), unapproved state (407) (this can be an initial state), or revoked state (408). The approved state can be recorded by the version control module 149a using an approval flag. If a template is revoked, the approval flag can be removed.

The static validator 149b may then access version state information 403 (e.g., unapproved, approved or revoked), which may be also copied to the MD 165a within the script. The version state information 403 may include, for example, information 405 indicating that the template 420a of script A is approved for execution (406), template is unapproved (e.g., initial/incomplete state) (407), or information 408 indicating that the template 420a is revoked. The metadata may include information 405 indicating whether the template is approved for automatic execution. In an example embodiment, information 405 may be included as part of the version state information 403 or may be separate metadata (as illustrated in FIG. 4). In instances when the template is revoked, the static validator 149b may indicate (e.g., to the automation module 149c, the pre-check module 150 and/or the post-check module 152) that one or more scripts within the network change procedure 138 is revoked. Execution of the network change procedure may then be suspended and/or automatic rollback may be initiated to a safe system state (e.g., using the rollback module 154). The static validator 149b may generate one or more warnings to indicate validation errors, or may halt the execution of a network change procedure based on such validation errors.

In accordance with one or more embodiments, after the scripts A, . . . , N are generated (or selected) by the script module 148, the scripts may be approved using the static validator 149b and the version control module 149a so that version state information 403, 424 is included in the corresponding metadata of the scripts. The script module 148 (or any of modules 149c, 149b, 149a) may generate a hash information 440, which may be based on the version numbers of all scripts A, . . . , N in the network change procedure 138. The hash 440 may be used by, e.g., the automatic module 149c to verify that one or more scripts in the network change procedure 138 are approved for automatic execution, and determine whether any of the scripts associated with the hash are revoked based on the state information inside the script metadata. Revocation of a given script may take place using version control input 430 (e.g., from a network administrator), by changing the version state information 403, 424 to indicate a revoked state. Additionally, the hash 440 can be used to track the version state of the scripts or templates of a network change procedure, to notify of any revoked or unapproved scripts, and to halt (or lock) execution of the change procedure.

The automation module 149c may comprise suitable circuitry, interfaces, logic and/or code and may be configured to automatically execute one or more operations associated with a given script of the network change procedure 138. The automation module 149c may use the script metadata 165a, . . . , 165n to verify the script is not revoked and it is approved for automatic execution (e.g., by using the version state information 403, 424 within the scripts A, . . . , N). Upon verification that a script is approved for automatic execution, the automation module may execute the script from a library, such as the check library 149d. The check library 149d may include one or more executable operations associated with a pre-check operation, a post-check operation or any other operation for the network change procedure 138.

In accordance with one or more embodiments, the automation module 149c may be implemented within one or more of the modules 148, 150, 152, 154, and 156, so that the corresponding functionalities of these modules may be automatically performed based on, e.g., state information within metadata associated with one or more scripts of the network change procedure 138.

Referring again to FIG. 1, the pre-check module 150 may implement an automatic or manual check of the network change procedure and/or the network 102 before the network device change 138 is provided to the network 102. The pre-check module 150 may validate the types and/or sequencing of the scripts that comprise the network device changes. For example, the pre-check module 150 may enforce the use of scripts and/or may confirm that a script designated to make a certain change is consistent with an authorized script that is designated to make that type of change. In this way, the pre-check module 148 enforces a consistency to the changes made on the network by different users. The pre-check module 150 may also enforce the sequence or order of changes being made on the network devices 108/110. For example, if a change to a switch requires updates to other switches, network components, or databases, the pre-check module 150 may confirm that the network device changes include those changes. Additionally, those changes may be done in a certain sequence or order. Once the network device changes 138 have been validated, the pre-check module 150 may turn its attention to the status of the network 102 to determine if one or more components of the network device changes 138 may be implemented in view of the current network state.

The pre-check module 150 may query the network 102 for status information on any or all aspects of the network 102. The pre-check module 150 may determine whether the network 102 is in a state that will enable the implementation of one or more changes of the network change procedure. In one embodiment, the pre-check module 150 may determine that the network 102 is in a state that will enable all of the network changes in the network device changes 138 and that the network 102 is likely to remain in that state until the network change procedure has been implemented in its entirety. In another embodiment, the pre-check module 150 may determine that the network 102 is in a state that will enable at least a portion of the network changes specified in the network change procedure 138. In this instance, the implementation of the network device changes 138 may be staggered, so that certain changes may be made as the network 102 becomes available to make the change. Further, the scripts may include instructions for a delay between the scripts. The delay allows the network performance to be monitored after the change to verify that the change was not detrimental to the network 102. In one embodiment, the pre-check module 150 may also verify that the hardware and software configurations of network interconnect devices 108 or the network 102 are consistent with the changes being implemented by the network change procedure 138. This may include determining that underlying configuration assumptions for the network are proper. For example, the pre-check module 150 may not initiate the network change procedure if the changes being implemented are not capable of being implemented. For instance, a script is revoked or upgrading the software of a device to perform a hardware function that the device, as configured, is not capable of performing due to a lack of hardware. In this case, the device hardware may also have to be upgraded.

The post-check module 152 may monitor the network 102, including devices 108 and 110, after one or more changes have been made as part of the network device changes 138. The post-check module 152 may query network devices 108 in the network 102 for performance information; or, it may monitor the output, error, or event log files of the network 102 to determine the impact of network changes. In another embodiment, the network 102 may be configured to provide performance information to the post-check module 152. The performance information may be provided continuously or intermittently as desired by the network administrator. The performance criteria may set by the network administrator or by service level agreements that dictate network performance goals. The performance information may be related to performance characteristics associated with the network 102, the network interconnect devices 108, or the server 110. The performance characteristics may include latency, throughput, response times, utilization, bandwidth, and/or packet loss. Performance information may also include error logs or readings that indicate that some portion of the network 102 is not performing as intended.

In one embodiment, the network device changes 138 may include commands that direct the network 102 to provide specific performance information to the post-check module 152. In another embodiment, the network device changes 138 may direct the post-check module 152 to query the network 102 for specific performance information. In this way, the network device changes 138 may include post-check instructions (in addition to the delay instructions) to assist in monitoring network performance during changes. In some cases, network performance may degrade, may operate incorrectly as a result of the change, or there may be a revoked script as part of a network change procedure. The CM server 104 may be given a role to alleviate or correct the poor performance by, e.g., automatically initiating a rollback to a known safe state of the network. Additionally, the post-check module 152 and/or the automation module 149c may detect a result of a given operation is not an expected result, and then trigger automatic rollback using the module 154. The rollback module 154 may assist in the corrective process by initiating and performing an automatic rollback.

The rollback module 154 may implement corrective actions on the network 102 when a change to the network devices 108 is determined to be the cause of degraded or incorrect network performance, or when automatic execution of a given operation has failed. As noted above, the network device changes 138 may comprise a plurality of discrete scripts that implement network changes in an operation-by-operation process, where one or more of the operations may be performed automatically based on metadata within the corresponding operation script. When the post-check module 152 detects network problems (such as failed automatic execution of an operation), the rollback module 154 may determine which scripts or changes may have caused the problem. Accordingly, the rollback module 154 may undo those changes to the network devices 108/110, and direct the post-check module 154 to assess network performance without those changes. In one embodiment, the discrete scripts of the network change procedure may be undone one at a time and in the order in which they were implemented, to determine a safe/stable network state that the network can go back to. This provides the network 102 with the opportunity to undo the changes in a deliberate manner and may be used to troubleshoot the network performance issue.

If the network performance reaches a predetermined threshold, the rollback module 154 may alert a network administrator to investigate the issue or may automatically initiate rollback to a known stable state. In one embodiment, the network performance may improve beyond a predetermined threshold and the rollback module 154 may attempt to automatically re-implement the changes that were undone. In some instances, the network changes may not be directly tied to the degraded network performance.

The scram module 156 may determine a safe state for the network 102 when network performance exceeds or falls below a predetermined threshold. The safe state may include a network configuration that does not include the last five changes that were made to the network devices 108. Therefore, instead of undoing each change one at a time and determining the impact of each undone change, the scram module 156 may undo all five changes without assessing the impact of each undone change. In some instances, the undone changes may be done in reverse sequence of their implementation. In other instances, the changes may be done out of order, one at a time, or concurrently. In another embodiment, the scram module 156 may determine that the poor network performance is related to changes made to specific network devices 108. The scram module 156 may determine that a safe state may be achieved by isolating the network device 108 instead of undoing changes on to network device. For example, the scram module 156 may direct the network device 108 to shut down all ports on the component. In this way, the network device 108/110 may be isolated from the network 102 and the functions or operations of this network device 108/110 may be routed to other network devices 108/110 in the network 102.

Similar to those described above, the one or more I/O interfaces 144 allow for the coupling of devices such as displays, keyboards, storage devices, and so forth to the one or more processors 140 of the CM server 104. Likewise, the one or more I/O interfaces 144 may be configured to couple the CM server 104 to one or more networks 102.

Figure 2:
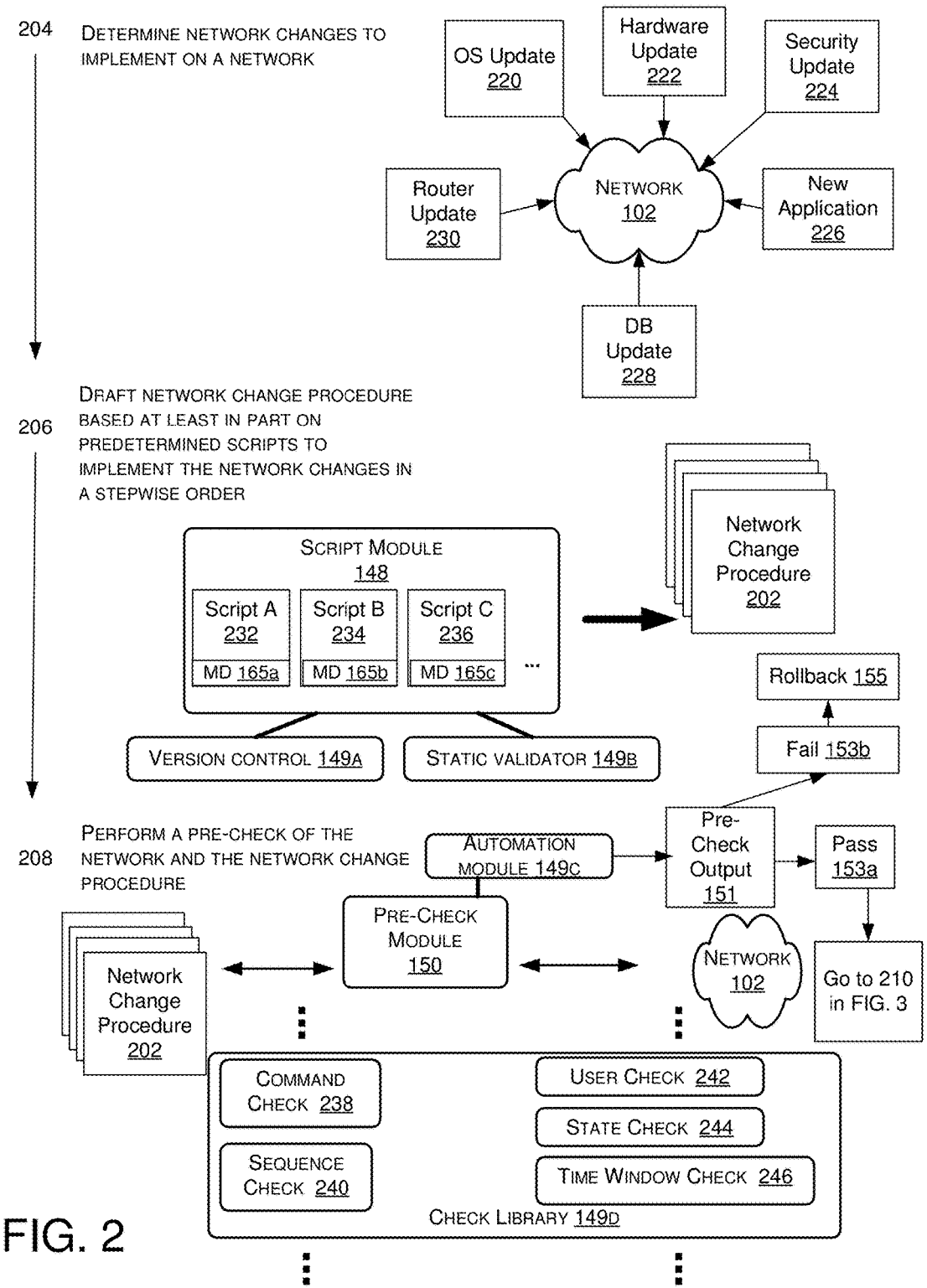
FIGS. 2-3 illustrate a flow diagram with corresponding illustrations for automatically implementing configuration changes on a network, in accordance with an embodiment of the disclosure.
Figure 3:
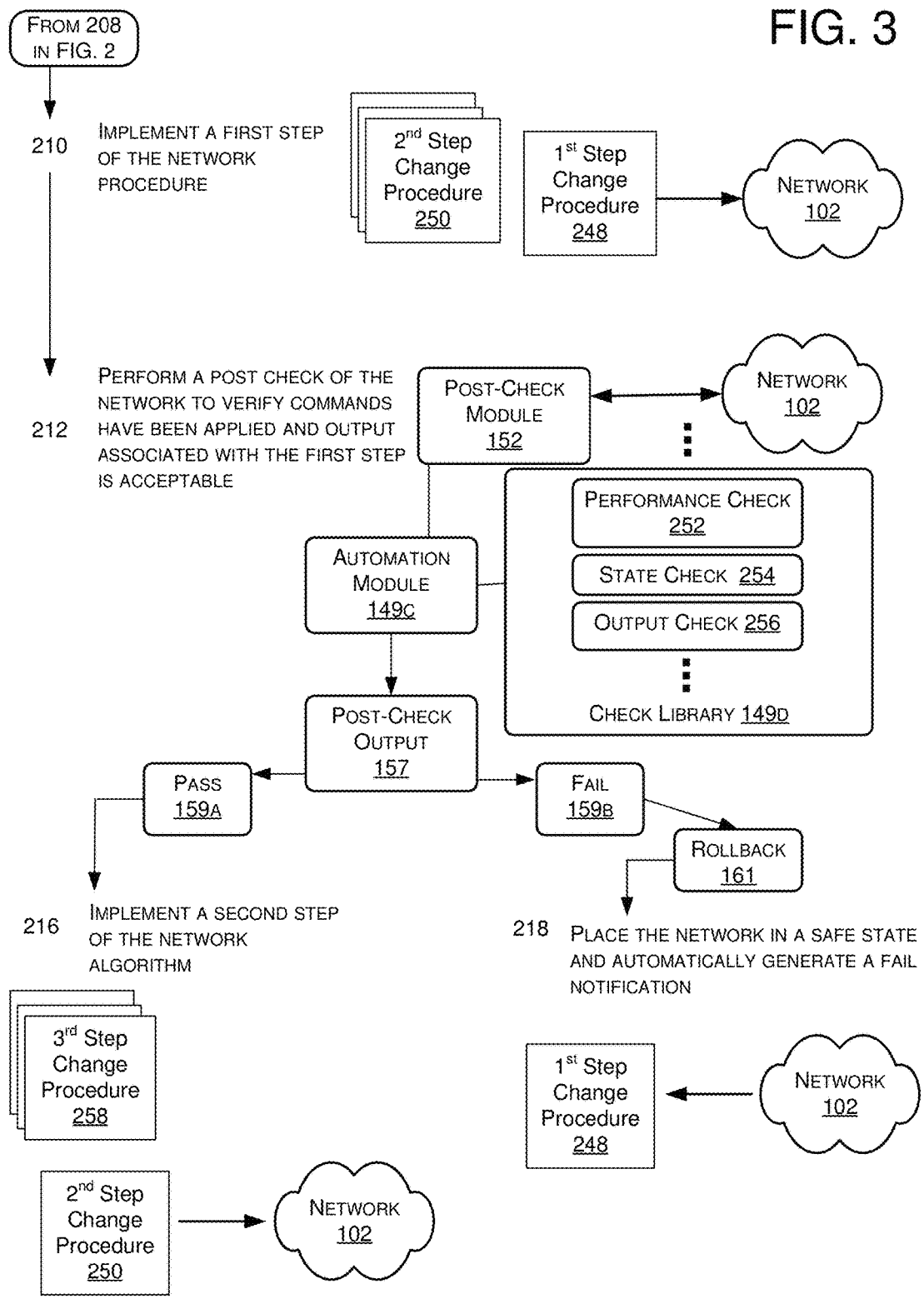

FIGS. 2-3 illustrate a flow diagram with corresponding illustrations for automatically implementing configuration changes on a network, in accordance with an embodiment of the disclosure. For example, FIGS. 2-3 may illustrate implementing changes on a network device 108 using a network change procedure 202 generated by the CM server 104. Additional embodiments can include operations performed in a different order, additional operations, or even omitting a portion of the operations illustrated in FIGS. 2-3.

At 204, the CM server 104 may receive instructions from a network administrator to make one or more changes to the network device 108. The changes may include, but are not limited to: an operating system update 220, a hardware update 222, a security update 224, deployment of a new application 226, a network database update 228, and/or a router or switch update 230, such as an update to the configuration of a router or switch, an update to the firmware or software of a router or switch.

At 206, the script module 148 may be used to generate the network change procedure 202 based in part on the inputs received at 204. Alternatively, the network administrator may select specific scripts to deploy using a graphical user interface that presents the available authorized scripts that may be used to implement the network device changes 138. For example, the router update 230 may be implemented using a sequence of scripts (e.g., script A 232, script B 234, script C 236 and so forth). The type and sequence of the scripts may be dictated by network design and this example is only intended for explanatory purposes. For example, script A 232 may be instructions to the network devices 108 to route communications around a specific router for a period of time. Script B 234 may implement a configuration change on the specific router, and script C 236 may direct the network devices 108 to start using the specific router again. At the very least, the network change procedure 202 may include one or more operations that may be implemented in a sequence to make the router update. Each of the three scripts 232, 234, 236 may be selected by the network administrator using a user interface to the CM server 103, e.g., a web browser interface, a client program, etc. and the scripts 232, 234, 236 may be selected from a library of pre-approved scripts, such as library 149d. The scripts may include pre-approved instructions that may complete a specific change or operation. In this way, changes to the network 102 may be standardized to follow specific protocols. This may prevent multiple users from using different instructions which may result in changes being performed in an inconsistent manner and may ensure that the user logging in to implement the changes is authorized for those changes. The script module 148 may enforce the use of specific scripts for certain tasks and may require that unapproved scripts provided by users to be submitted to an approval process before they are incorporated into the network change procedure 202. Although the scripts 232, 234, 236 may be updated by the user to accommodate change specific attributes, the script module 148 may limit the amount or type of changes that may be made without being sent through the approval process. For example, the user may be able to update certain fields in the script, but would not be given access to change the more substantive features of the script. This script module 148 enforcement feature may also apply to ordering or sequencing of the scripts 232, 234, 236 within the network change procedure 202.

In accordance with one or more embodiments, the script module 148 may use the version control module 149a and the static validator 149b to generate the scripts 232, . . . , 236 (e.g., as explained above in reference to FIG. 4). More specifically, metadata 165a, . . . , 165c may be included in the scripts, and the metadata may indicate that one or more of the scripts are approved for automatic execution and are not revoked. After the static validator verifies the code of each script 232, . . . , 236, processing may continue at 208.

At 208, the pre-check module 150 may receive the network changes and may use the automation module 149c to implement a series of checks that may include, but are not limited to, a command check 238 and a sequencing check 240. The command check 238 may verify that the instructions with the selected scripts 232, 234, 236 are proper and that the instructions are executable on the network devices 108. The command check 238 may make sure that the instructions are operating on the appropriate components; such as, that the changes are being applied consistently across the components and that the changes are consistent with each other. For example, an error may occur when instructions are made to change the configuration of one component and then update a database in support of that change, but reference another component that was not changed. The command check 238 may also verify that the instructions within each script are executable by the network 102. The sequencing check 240 may verify the sequencing of the scripts 232, 234, 236 to ensure they are executable in the proposed sequence. The pre-check module 150 may also perform a user check 242 to verify that the user requesting the change on the network is authorized to make that change.

The pre-check module 150 may also do a state check 244 on the network 102. This may include verifying that the network 102 is in a state that would be appropriate to make a change. For example, if the network traffic was peaking and the network 102 did not have the capacity to route traffic through other routers, the network change procedure would attempt to make a router configuration change at that time. The pre-check module 150 may also do a time window check 246 to confirm that the network is likely to remain in a certain state for a certain period of time. In this way, the network 102 changes may be implemented without causing a disruption to the network users. In one embodiment, the time check 246 may determine if the time window is large enough to implement the entire network change procedure 202. In another embodiment, the time check 246 may determine if the time window is large enough to implement one or more portions of the network change procedure 202. For example, the network change procedure 202 may implement a portion of changes and then wait to implement the remaining portions of the changes at a later time.

In accordance with one or more embodiments, the automation module 149c may determine that one or more of the checks 238, . . . , 246 are part of the scripts 232, . . . , 236. After verifying that the checks are approved for automatic execution (e.g., by using state information within metadata associated with the scripts 232, . . . , 236), the automation module 149c may execute the checks 238, . . . , 246 from within a check library 149d. Each check may generate a pre-check output 151, which may be, for example, a Pass or Fail result (153a or 153b). Upon detecting a pass result, processing may resume at 210 in FIG. 3. However, upon detecting a Fail result 153b, the module 149c may automatically initiate rollback 155 using, e.g., the rollback module 154. Rollback 155 may include determining a previous network state and implementing the previous network state (e.g., reversing one or more network changes performed up to the rollback). If the Fail check result 153b is associated with a first operation of the procedure 202, then a rollback to an initial network state is performed.

Referring to FIG. 3, at 210, the CM server 104 may implement the first operation 248 of the network change procedure 202 on the network 102. For example, a router update may include a first operation 248 that may direct the network 102 to direct traffic around the targeted router. The second operation of the router update 250 may be waiting to be processed until the post check module 152 has confirmed the impact of the first operation 248.

At 212, the post-check module 152 and/or the automation module 149c may initiate one or more checks, such as a performance check 252, a state check 254, and/or an output check 256 on the network 102. The performance check 252 may verify that the network performance for the network server 110, the routers and switches 132, the data store 134, and the network security 136 components are operating as intended. The state check 254 may verify that the network 102 is in an appropriate state following the implementation of the first operation 248 of the network change procedure 202. The post-check module 152 may also implement an output check 256, to verify that the information being sent to the network user device 106 meets any service level agreement requirements or the or that the output from the network 102 is consistent with outputs prior to the change.

In accordance with one or more embodiments, the automation module 149c may use metadata within one or more scripts of the network change procedure 202 to verify the corresponding operations (e.g., checks 252, . . . , 256) are authorized for automatic execution (e.g., based on the state information within the script metadata, as illustrated in FIG. 2). If a check is approved for automatic execution and it is not revoked, then the check may be performed using, e.g., check library 149d. A post-check output 157 may be generated as a result of the automatic check execution. The post-check output may be, for example, a Pass or Fail result (159a or 159b). Upon detecting a pass result 159a, processing may resume at 216. However, upon detecting a Fail result 159b, the module 149c may automatically initiate rollback 161 using, e.g., the rollback module 154 and place the network in a safe state (at 218). Rollback 161 may include determining a previous network state and implementing the previous network state (e.g., reversing one or more network changes performed up to the rollback). If the Fail check result 159b is associated with a first operation of the procedure 202, then a rollback to an initial network state is performed.

At 216, the CM server 104 may implement the second operation 250 of the network change procedure 202 when the first operation 248 passes the post-check described in the description of 212. The CM server 104 may not implement the third operation 258 until the second operation has passed a post check similar to the one described in the description of 212.

At 218, CM server 104 may place the network in a safe state by rolling back one or more network changes (e.g., by performing rollback 161), and may automatically generate a notification of the FAIL to, e.g., a network administrator. In this embodiment, the CM server 104 may roll back the first operation 248 and determine whether the rollback resulted in a stable network state. If the rollback was not effective, the CM server 104 may notify the network administrator to take additional off script actions to remedy the network problem.

Figure 5:
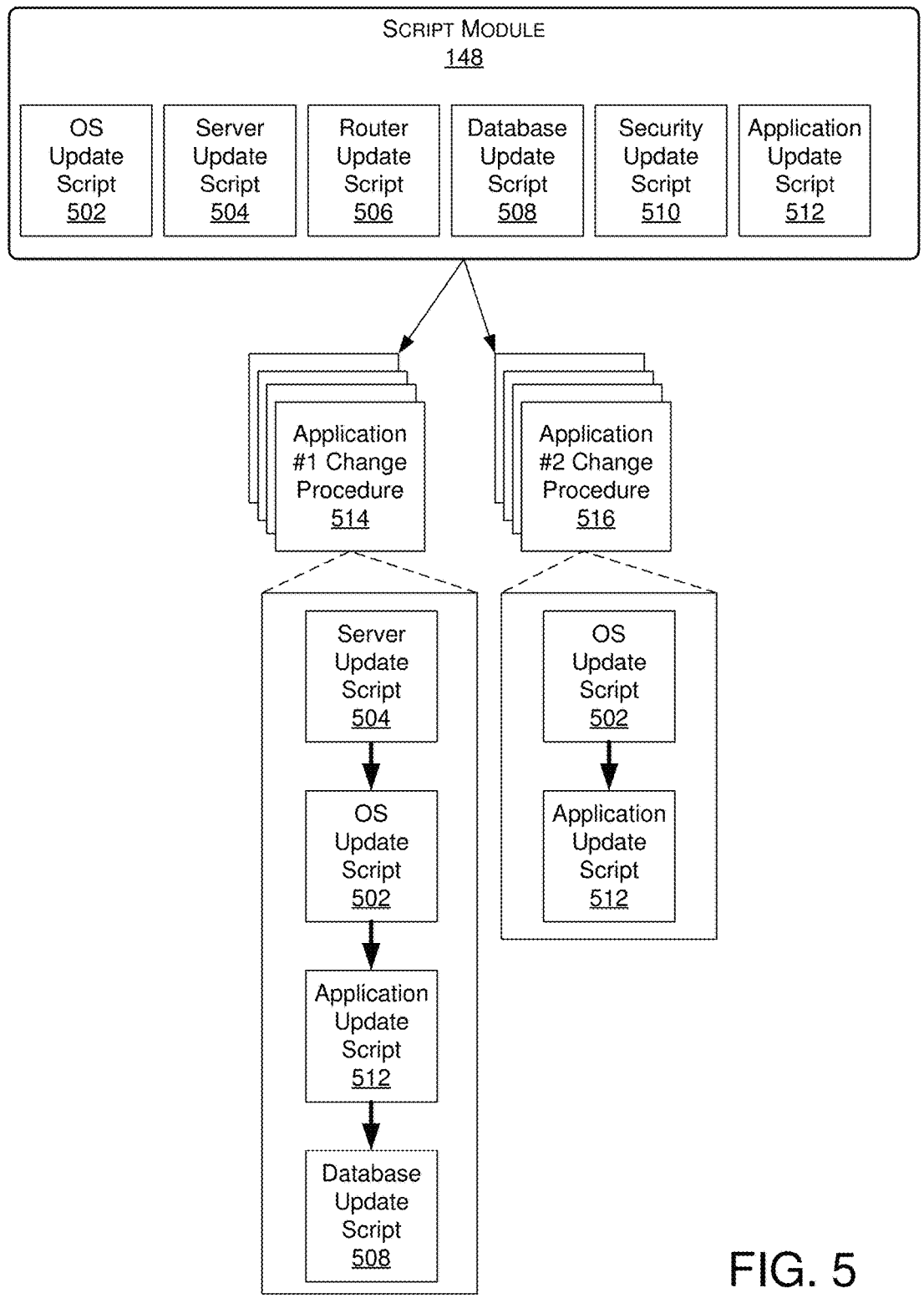
FIG. 5 illustrates the structure of one or more network changes that may be used to implement configuration changes on the network, in accordance with an embodiment of the disclosure.

FIG. 5 illustrates the structure of one or more network changes that may be used to implement configuration changes on the network, in accordance with an embodiment of the disclosure. Referring to FIG. 5, the example scripts 502, . . . , 512 within the script module 148 may be associated with a network change procedure, such as 514 or 516. In this example, the scripts 502, . . . , 512 are representative of pre-approved instructions to perform certain tasks in a network change procedure. A network administrator may choose from these tasks to generate a network change procedure (e.g., 514, 516, 138 or 202), or the CM server 104 may select and arrange the scripts to generate the network change procedure.

In this example, the scripts may include an operating system update 502, a server update 504, a router update 506, a database update 508, a security update 510, and an application update 512. At high level, the aforementioned scripts may be integrated together to implement a specific network change. Their arrangement may be dependent upon the type of change being made and the design or current state of the components of the network. By way of example, the network application #1 change procedure 514 and network application #2 change procedure 516 may be intended to make an update two different applications on the network 102. However, the updates to the first application may require several changes to several other components of the network 102 to be implemented properly. In contrast, the updates to the second application may need a fewer amount of to be properly implemented. For example, the first application may require a server update to include new capabilities to include more memory and a corresponding operating system update to be completed before the application update could be effective. Additionally, the new data generated by the application update may need a new entry in a database to store that data. Accordingly, the CM server 104 may select scripts from a library that includes pre-approved instructions to perform a variety of changes to the network devices 108.

In the first application embodiment, the script module 148 may use a server update script 504, an operating system update script 502, a network application update script 512, and a database update script 508 to generate the application #1 change procedure 514. The procedure 514 may provide a template for the network administrator to approve and edit to comply with their specific needs. For example, the scripts may include certain fields that may be edited to address the details of the change. These details may include the network application name, location, or any other applicable item that may address a network application specific detail.

However, in one embodiment, the substantive portion of the change procedure or script may not editable so that the way in which applications changes are implemented is consistent from one network administrator to the next. If changes are needed beyond the editable portions of the script, the new script may need pre-approval or review before the script may be used to make network device 108 changes. One or more of the scripts within the change procedures 514, 516 may be approved for automatic execution, and may be automatically executed by the automation module 149c, as described herein.

In contrast to first application change, the second application change may be done on a portion of the network 102 that is configured differently than the portion of the network 102 that uses the first application. Due to the configuration difference, the second application may be implemented using a different set of scripts. For example, the second portion of the network 102 already includes the updates to the server and database. Accordingly, the network application #2 change procedure 516 may only need an operating system update and the network application update to complete the application update on the network 102. In this way, the operating system update script 502 and the network application update script 512 may be incorporated into the network application #2 change procedure 516.

Figure 6:
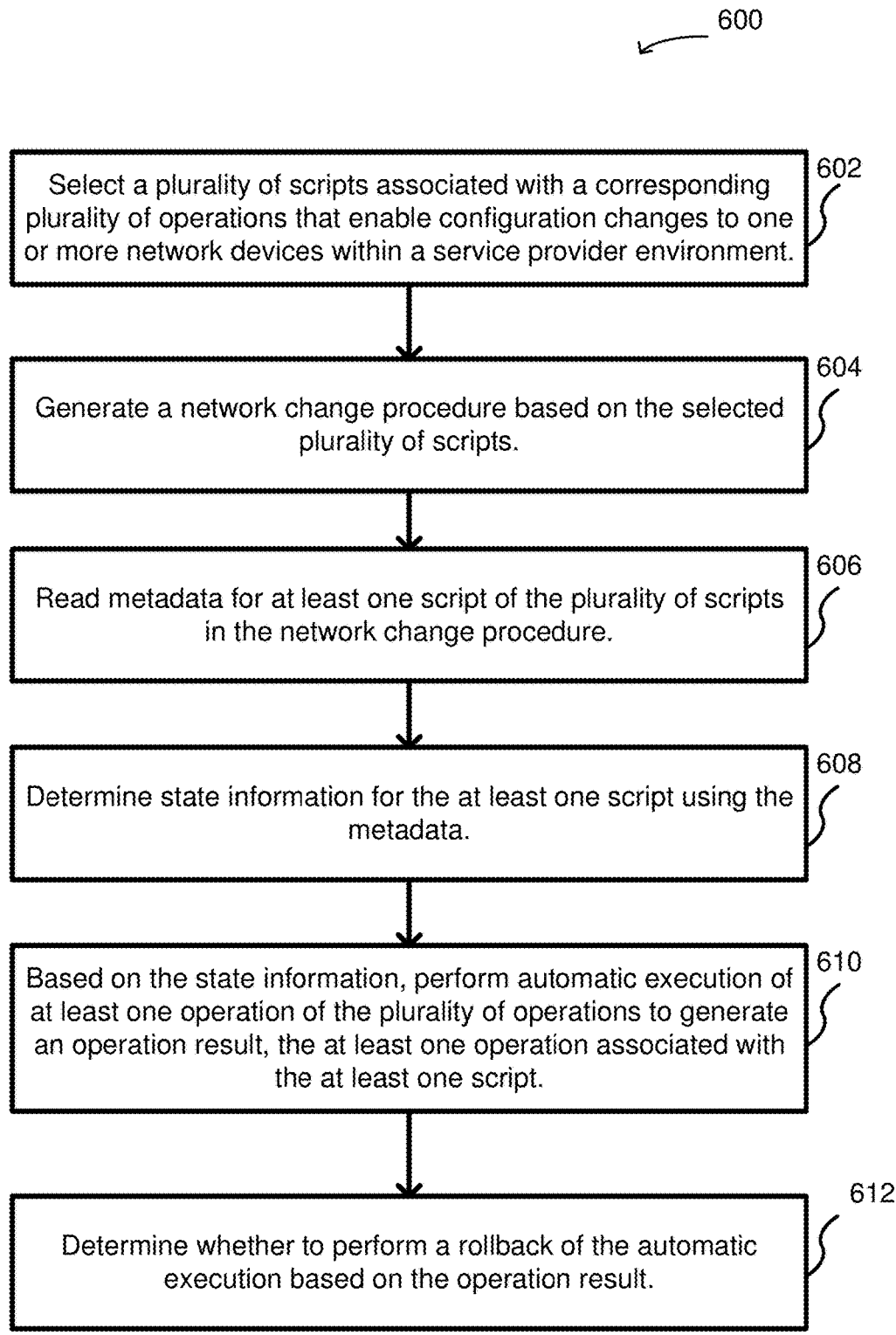
FIG. 6 illustrates a flow chart of a method according to a first embodiment for providing network configuration changes in a service provider environment.

FIG. 6 illustrates a flow chart of a method according to a first embodiment for providing network configuration changes in a service provider environment. Referring to FIGS. 1-4 and 6, the example method 600 may start at 602, when a plurality of scripts associated with a corresponding plurality of operations may be selected, where the scripts enable configuration changes to one or more network devices within the service provider environment. For example, the script module 148 within the CM server 104 may select scripts 232, . . . , 236 for performing one or more operations associated with each script. At 604, the script module 148 may generate a network change procedure (e.g., 202) based on the selected plurality of scripts (e.g., 232, . . . , 236). At 606, metadata for at least one script of the plurality of scripts in the network change procedure may be read. For example, the automation module 149c may acquire the metadata 165a, . . . , 165c for scripts 232, . . . , 236 within the network change procedure 202. At 608, the automation module 149c may determine state information for the at least one script using the metadata. For example, version state information 403, 424 may be determined for scripts 420a, . . . , 420n. The state information may indicate whether the script is revoked and whether the script is approved for automatic execution. At 610, based on the state information, the automation module 149c may automatically execute at least one operation of the plurality of operations to generate an operation result (e.g., 151). At 612, the automation module 149c may determine whether to perform a rollback of the automatic execution based on the operation result. For example, if the operation result 151 is a Fail result 153b, then rollback 155 may be initiated and performed (e.g., by the rollback module 154).

Figure 7:
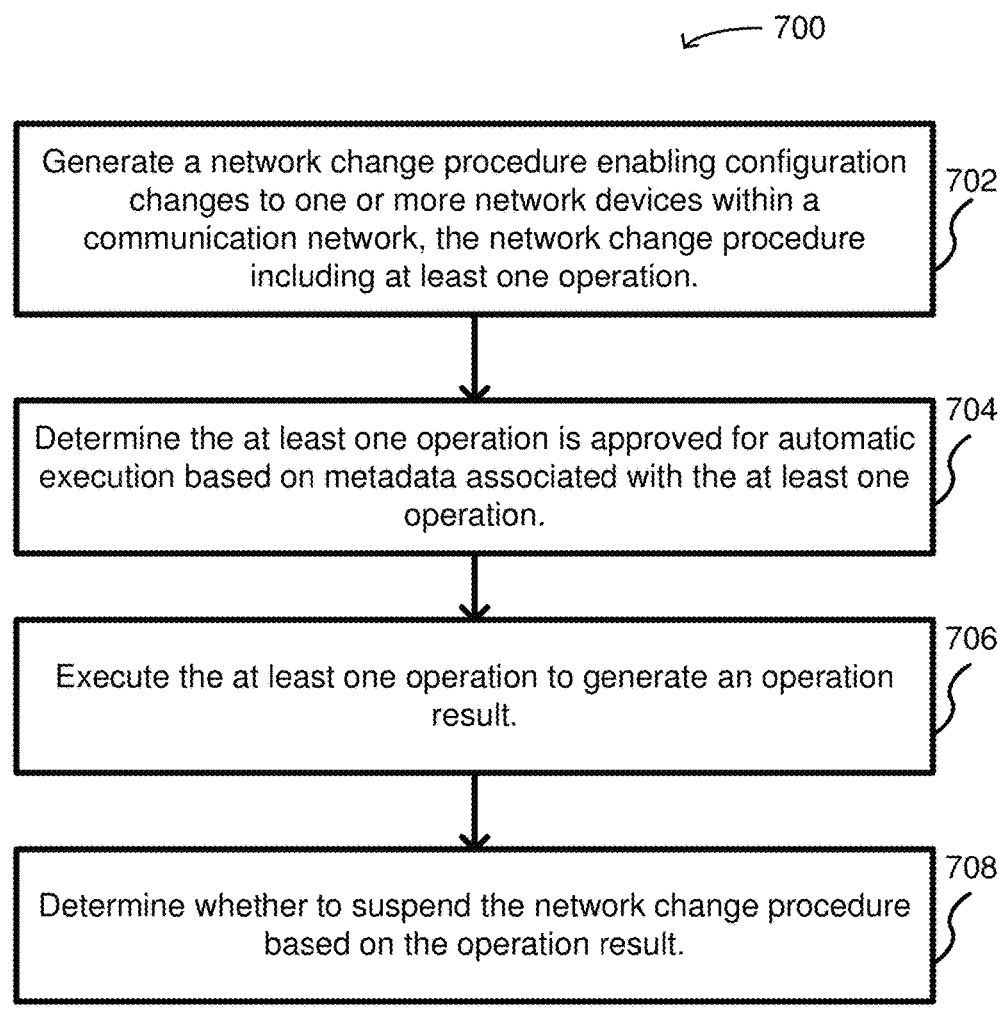
FIG. 7 illustrates a flow chart of a method according to a second embodiment for providing network configuration changes in a service provider environment.

FIG. 7 illustrates a flow chart of a method according to a second embodiment for providing network configuration changes in a service provider environment. Referring to FIGS. 1-4 and 7, the example method 700 may start at 702, when the script module 148 may generate a network change procedure (e.g., 202) enabling configuration changes to one or more network devices (e.g., 108, 110) within a communication network (e.g., 102 in 100). The network change procedure (e.g., 202) may be include at least one operation (e.g., operations associated with scripts 232, . . . , 236). At 704, the automation module 149c may determine the at least one operation is approved for automatic execution based on metadata associated with the at least one operation. For example, the automation module 149c may use the version state information 403, 424 within the script metadata 165a, . . . , 165n to make such determination. At 706, the automation module 149c may execute the at least one operation (e.g., using the check library 149d) to generate an operation result (e.g., 151 or 157). At 708, the automation module 149c may determine whether to suspend the network change procedure based on the operation result.

Figure 8:
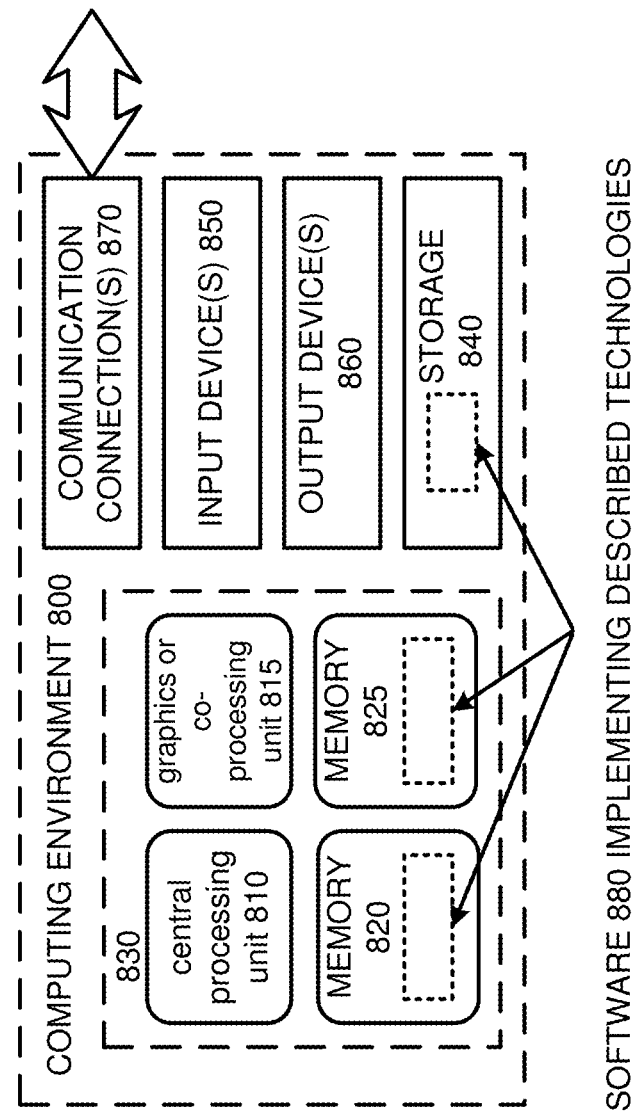
FIG. 8 depicts a generalized example of a suitable computing environment, in which the described innovations may be implemented.

FIG. 8 depicts a generalized example of a suitable computing environment, in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method for providing network configuration changes in a service provider environment, the method comprising:
   by a server computer of the service provider environment:
   selecting a plurality of scripts associated with a corresponding plurality of operations that enable configuration changes to a network device within the service provider environment;
   generating a network change procedure, the network change procedure comprising at least a first configuration update script and a second configuration update script of the plurality of scripts;
   reading metadata for the first configuration update script, the metadata including an approved network region;
   determining state information for the first configuration update script using the metadata;
   based on the state information, performing automatic execution of a configuration update operation associated with the first configuration update script;
   delaying execution of a configuration update operation associated with the second configuration update script while performing a post-check operation, the post-check operation comprising verifying whether the configuration update operation associated with the first configuration update script was detrimental to a network performance parameter; and
   responsive to determining that the configuration update operation associated with the first configuration update script was detrimental to the network performance parameter, performing a rollback of the configuration update operation associated with the first configuration update script.

2. The method according to claim 1, wherein performing automatic execution of the configuration update operation associated with the first configuration update script comprises:
   accessing a library storing the operations associated with the plurality of scripts.

3. The method according to claim 1, further comprising performing at least one pre-check operation prior to performing the automatic execution of the configuration update operation associated with the first configuration update script.

4. The method according to claim 1, wherein the state information indicates that the first configuration update script is either approved for automatic execution or revoked.

5. The method according to claim 4, wherein the configuration update operation associated with the first configuration update script is automatically executed when the state information indicates that the first configuration update script is approved for automatic execution.

6. The method according to claim 4, further comprising:
   when the state information indicates that the first configuration update script is revoked:
      providing a notification that the first configuration update script is revoked; and
      suspending automatic execution of one or more remaining operations of the plurality of operations.

7. A non-transitory computer-readable storage medium including instructions that upon execution cause a computer system to:
   in a network-enabled device in a communication network:
      generate a network change procedure enabling configuration changes to a network device within the communication network, the network change procedure comprising a plurality of scripts, the plurality of scripts comprising a first configuration update script and a second configuration update script;
      determine the first configuration update script is approved for automatic execution based on metadata associated therewith;
      automatically execute the first configuration update script;
      delay an automatic execution of the second configuration update script while performing a post-check operation, the post-check operation comprising verifying whether the execution of the first configuration update script was detrimental to the communication network and generating an operation result based on the verification; and
      if the operation result indicates that the execution of the first configuration update script was not detrimental to the communication network, automatically execute the second configuration update script.

8. The non-transitory computer-readable storage medium according to claim 7, wherein the network change procedure further comprises:
   a pre-check operation to check the communication network and/or device state of the network-enabled device.

9. The non-transitory computer-readable storage medium according to claim 7, wherein
   each script comprises metadata.

10. The non-transitory computer-readable storage medium according to claim 9, wherein the metadata of each script comprises at least one of the following:
   a script version number;
   script state information, the script state information indicating whether the script is approved for automatic execution, unapproved for automatic execution, or revoked;
   a script expiration date;
   script owner information; or
   script region of use information.

11. The non-transitory computer-readable storage medium according to claim 10, wherein the instructions upon execution further cause the computer system to:
   automatically execute the first configuration update script when the state information indicates that the first configuration update script is approved for automatic execution.

12. The non-transitory computer-readable storage medium according to claim 10, wherein the instructions upon execution further cause the computer system to:
   for each script, acquire version information from the metadata, the version information associated with the corresponding operation; and
   generate a hash value for the script, the hash value based on the acquired version information.

13. The non-transitory computer-readable storage medium according to claim 12, wherein the instructions upon execution further cause the computer system to:
   prior to automatically executing the first configuration update script, verify that the network change procedure is approved based on the hash value.

14. The non-transitory computer-readable storage medium according to claim 13, wherein during the verification that the network change procedure is approved, the instructions upon execution further cause the computer system to:
   verify the first configuration update script is not revoked based on the version information within the hash value.

15. The non-transitory computer-readable storage medium according to claim 7, wherein the instructions upon execution further cause the computer system to:
   if the operation result indicates that the execution of the first configuration update script was detrimental to the communication network, perform a rollback of the automatically executed first configuration update script.

16. The non-transitory computer-readable storage medium according to claim 15, wherein the instructions upon execution further cause the computer system to:
   during the rollback, automatically execute one or more rollback instructions to return the network-enabled device to a previous safe state, wherein the previous safe state is a state associated with a failure-free operation result.

17. A system for providing network configuration changes in a network environment, the system comprising:
   in a server computer comprising a memory coupled to a processor:
      a script compiler configured to generate a network change procedure for updating a network device using a plurality of scripts, the plurality of scripts comprising a first configuration update script comprising metadata, and a second configuration update script comprising metadata;
      a static validator operable to access the metadata and verify the first configuration update script is valid and that the first configuration update script can be automatically executed; and
      an automation processor configured to, upon successful verification by the static validator, automatically execute the first configuration update script, and then perform a post-check operation to generate an operation result;

wherein an automatic execution of the second configuration update script, subsequent to the first configuration update script, is delayed while the post-check operation is performed.

18. The system according to claim 17, wherein the static validator is further operable to:

access state information within the metadata to verify that the first configuration update script is not revoked and can be automatically executed; and prevent automatic execution of the first configuration update script if the first configuration update script is revoked.

19. The system according to claim 18, wherein the server computer further comprises a version controller operable to store the state information for the scripts.

20. The system according to claim 17, wherein the automation processor is further configured to:

automatically rollback the automatic execution of the first configuration update script based on the operation result, wherein the automatic execution is rolled back to a starting point of the network change procedure or to a previous safe state of the server computer.

21. The system according to claim 17, further comprising an analytics processor configured to generate data associated with execution of the network change procedure, the data comprising one or more of the following, for a given one of the plurality of scripts:

average time for automatically executing the script;

information indicating whether the script was executed successfully;

information indicating whether there are errors during automatic execution of the script; or statistical data indicating repeat successful automatic execution of the script in multiple automatic executions of the script over a time period.

* * * * *